Patented Jan. 5, 1926.

1,568,873

UNITED STATES PATENT OFFICE.

CLARENCE J. BROCKBANK, OF PHILADELPHIA, PENNSYLVANIA, ASSIGNOR TO ABRASIVE COMPANY, OF PHILADELPHIA, PENNSYLVANIA, A CORPORATION OF PENNSYLVANIA.

METHOD OF MANUFACTURING ARTIFICIAL ABRASIVES.

No Drawing.  Application filed September 11, 1920.  Serial No. 409,661.

*To all whom it may concern:*

Be it known that I, CLARENCE J. BROCKBANK, a subject of the King of Great Britain, residing in Philadelphia, county of Philadelphia, Pennsylvania, have invented certain Improvements in Methods of Manufacturing Artificial Abrasives, of which the following is a specification.

The principal object of my invention is to provide means for obtaining artificial aluminous abrasive possessing certain characteristics of brittleness and cool cutting qualities not ordinarily obtainable in the customary methods of manufacture.

In the process of manufacturing artificial corundum or aluminous abrasive it has been the custom heretofore to smelt in the electric furnace bauxite ore, emery or other aluminous ores, with sufficient coke to effect substantial reduction of the oxides of silica, iron and titanium. The metals so reduced settle from the molten alumina to the hearth of the furnace. In practice it has been found undesirable, however, to attempt to remove the iron oxide and silica completely because of the danger of forming reduction products of alumina which would cause disintegration of the finished product on exposure to the atmosphere. Usually, therefore, such abrasives contain from 3 to 4% of silica, iron oxide and titania after smelting, these materials being present in the corundum crystals in the form of threads or amorphous inclusions.

For some purposes it is very desirable to carry reduction further than can be done by the process above described, principally because a pure corundum crystal aggregate is more brittle than one containing internal impurities, and such material is of great advantage in the manufacture of special wheels for internal grinding where a brittle abrasive, with cool cutting qualities is essential.

I have discovered that it is possible to effect more complete reduction of aluminous ores, and to profoundly modify the crystal structure of the resultant abrasive by adding to the furnace charge a quantity of boric acid. I have discovered that it is also possible to increase the proportion of coke in the charge, and prolong the period of fusion, without forming carbides or other reduction products of alumina if boric acid is present. The resulting product has been found to differ markedly in physical structure from aluminous abrasives produced by the usual process. Whereas, for example, in ordinary artificial aluminous abrasives the impurities, consisting of iron oxide, titanium dioxide and silica, are distributed uniformly throughout the body of the corundum crystals as threads and amorphous masses, in the product made in accordance with the principles of my invention the impurities are concentrated between the corundum crystals and may, after the fused corundum has been crushed to grain form, be substantially removed therefrom, thereby permitting the production of a material consisting of highly pure corundum crystals substantially free from detrimental mineral inclusions, and having the property of brittleness and the cool cutting qualities claimed.

In carrying out my method I have found that satisfactory results are obtained by adding to the furnace charge approximately 5% by weight of boric acid, although it will be understood that I do not limit myself to any particular proportions of the ingredients employed, the proportions depending to a great extent upon the quality of the ore. Nor do I limit myself to any specified time of fusion, which may vary with the size of the furnace and other factors.

As an example of my method, I may take bauxite ore as received from the mines and roast it in a rotary kiln to substantially remove the combined water. A typical analysis of this ore after calcining is

|   | Per cent. |
|---|---|
| Combined water | 1.05 |
| Alumina | 84.69 |
| Silica | 4.92 |
| Iron oxide | 5.58 |
| Titanium dioxide | 3.76 |

This ore is now mixed with ordinary coke, iron borings and boric acid in the following proportions:

|   | Pounds. |
|---|---|
| Calcined bauxite | 400 |
| Coke | 22 |
| Iron borings | 21 |
| Boric acid | 22 | and the mixture fused in an electric furnace of the arc type as generally used in the manufacture of aluminous abrasives. The furnace will be completely filled with molten material in approximately 30 hours, and will contain about 4 tons of material. The electrodes are then removed and the molten mass allowed to cool. Subsequently the fused alumina is separated from the metallic alloy which had settled to the bottom of the ingot, and crushed, powdered and passed over a magnetic separator, which removes any ferro-alloy that may be present, and also the magnetic minerals previously specified.

After grading to size the alumina grains are bonded with a ceramic bond and manufactured into wheels or other articles for the specific purposes above mentioned.

I claim:

1. The method of producing crystalline alumina substantially free from impurities, which consists in fusing an aluminous ore with a reducing agent and boric acid, and separating the fused alumina from the reduction products.

2. The method of producing a highly reduced aluminous abrasive, which consists of fusing a quantity of aluminous ore with boric acid, and with carbon theoretically in excess of that required for complete reduction of metallic oxides in the ore.

3. The method of producing a highly reduced aluminous abrasive substantially free from impurities which consists in fusing in a suitable furnace a charge comprising an aluminous ore, reducing materials, and approximately 5% by weight of boric acid and separating the fused aluminous material from the reduction products.

4. The method of producing a highly reduced aluminous abrasive, which consists of fusing an aluminous ore with coke, iron borings, and boric acid.

5. The method of producing a highly reduced aluminous abrasive, which consists of fusing a mixture of calcined bauxite, coke, iron borings, and boric acid, said materials being present in proportions by weight of approximately 85%, 5%, 5% and 5%, respectively.

6. The method of producing crystalline alumina substantially free from impurities, which consists of fusing an aluminous ore in the presence of boric acid, crushing and powdering the fused alumina, and passing the said powder through a magnetic separator.

7. The method of producing an abrasive body containing substantially pure crystalline alumina, which consists of fusing an aluminous ore with a reducing agent and boric acid, separating the fused alumina from the reduced impurities, and bonding the alumina grains to form the body.

CLARENCE J. BROCKBANK.